US006556113B2

(12) United States Patent
Ketschau et al.

(10) Patent No.: US 6,556,113 B2
(45) Date of Patent: Apr. 29, 2003

(54) ELECTROMAGNETIC ADJUSTING DEVICE

(75) Inventors: Christiane Ketschau, Cologne (DE);
Markus Deeg, Hochdorf (DE); Lothar Pfeiffer, Freiberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/051,878

(22) Filed: Jan. 17, 2002

(65) Prior Publication Data

US 2002/0121828 A1 Sep. 5, 2002

(30) Foreign Application Priority Data

Jan. 19, 2001 (DE) .................................. 201 00 950

(51) Int. Cl.⁷ .............................. H01F 7/13; H01F 7/08
(52) U.S. Cl. ...................... 335/220; 335/281; 335/274
(58) Field of Search ................................. 335/227, 236, 335/237, 255, 258, 270, 274, 281, 278

(56) References Cited

U.S. PATENT DOCUMENTS 3,004,546 A * 10/1961 Robins et al. ................ 137/82

FOREIGN PATENT DOCUMENTS

EP 0 464 370 A1 1/1992

* cited by examiner

*Primary Examiner*—Ramon M. Barrera
(74) *Attorney, Agent, or Firm*—Michael J. Striker

(57) ABSTRACT

An electromagnetic adjusting device for automatic transmissions of motor vehicles has an electromagnet having a magnetic coil, a substantially cup-shaped housing which surrounds the magnetic coil and is composed of a ferromagnetic material, the housing having a housing bottom, a ferromagnetic central part which extends from the housing bottom and supports the magnetic coil, and a movable armature located before the central part and leaving a working air gap so as to form with the housing and the central part a magnetic circuit which has a magnetic resistance for a magnetic flux, and means for changing the magnetic resistance, the means for changing the magnetic resistance including an axial depression provided in the central part and an axially displaceable ferromagnetic filling member inserted in the depression and limiting with a bottom of the depression an auxiliary air gap.

13 Claims, 2 Drawing Sheets

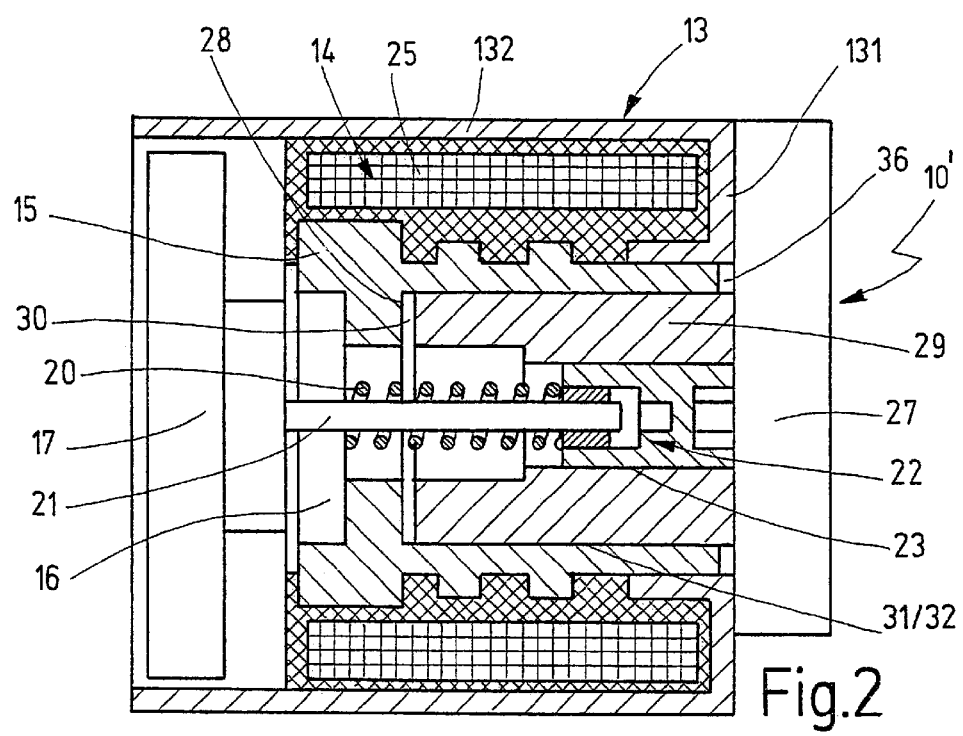
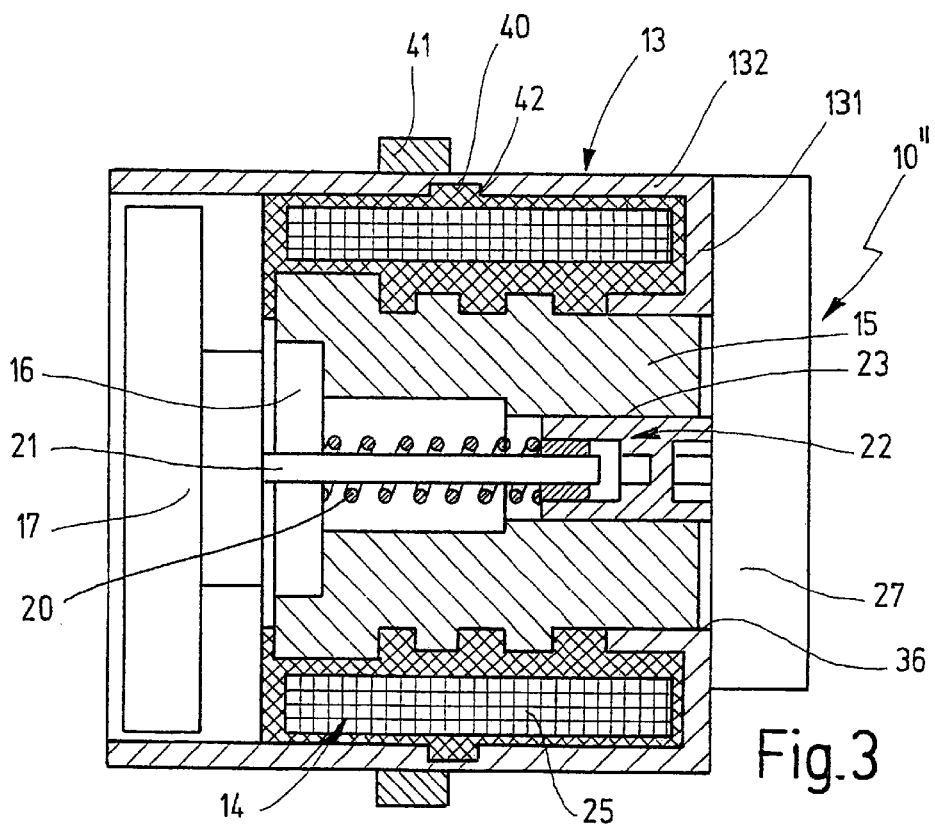

ELECTROMAGNETIC ADJUSTING DEVICE

BACKGROUND OF THE INVENTION

The present invention relates to an electromagnetic adjusting device, in particular for automatic transmissions in motor vehicles.

In such electromagnetic adjusting devices, the magnetic force produced by an electromagnet performs hydraulic regulating functions. The dependency between the excitation current supplied to the magnetic coil and the control regulating pressure is described by the regulating pressure-current characteristic line of the adjusting device. The line extends constantly, is specific, and forms the basis for the application in a motor vehicle. A substantial feature of the characteristic line is its slope. This slope is determined by the properties of the electromagnet. Fluctuations in the manufacturing tolerances for the components of the electromagnet act on the magnetic flux and thereby on the magnetic force so that in the characteristic lines of the same electromagnetic adjusting devices of one manufacturing series considerable fluctuations in the characteristic line slope can occur.

In known electromagnetic adjusting device with a proportional magnet for actuating of proportional valves as disclosed in the European patent document EP 0 464 370, for elimination of the negative influence of manufacturing dispersion and permeability differences of the magnetic material on the magnetic force of the proportional magnets and thereby on the slope of the characteristic line, means are provided with which the magnetic resistance of the magnetic circuit can be changed also after the assembly of the electromagnetic or the electromagnetics adjusting device within certain limits. Therefore the electromagnet can be post-adjusted with respect to its magnetic force. These means have an axially engaging ferromagnetic adjusting sleeve which is axially displaceable and with its portion that covers or overlaps the central part produces a magnetically well conductive connection between the central part and the housing body. The adjusting sleeve for this purpose is screwable in a central opening in the housing body. Depending on the size of the sleeve portion covering the central part, the magnetic flux in the magnetic circuit can provide a more or less greater portion to be available and thereby changes the magnetic resistance which counteracts the magnetic flux. The size of the covering or overlapping determines the height of the magnetic conductive value and influences thereby the total magnetic resistance.

SUMMARY OF THE INVENTION

Accordingly, it is an object of the present invention to provide an electromagnetic adjusting device which avoids the disadvantages of the prior art.

In keeping with these objects and with others which will become apparent after, one feature of the present invention resides, briefly stated, in an electromagnet having a magnetic coil; a substantially cup-shaped housing which surrounds said magnetic coil and is composed of a ferromagnetic material, said housing having a housing bottom, a ferromagnetic central part which extends from said housing bottom and supports said magnetic coil, and a movable armature located before said central part and leaving a working air gap so as to form with said housing and said central part a magnetic circuit which has a magnetic resistance for a magnetic flux; and means for changing the magnetic resistance, said means for changing the magnetic resistance including an axial depression provided in said central part and an axially displaceable ferromagnetic filling member inserted in said depression and limiting with a bottom of said depression an auxiliary air gap.

When the electromagnetic adjusting device is designed in accordance with the present invention it has the advantage that the iron cross section which is available for the magnetic flux remains unchanged during the post adjustment of the electromagnet and an adjustable electromagnetic resistance is connected parallel to the constant magnetic resistance of the magnetic circuit. Thereby the adjusting of the magnetic force can be performed very finely.

The inventive features for forming the adjusting means are structurally simple and can be produced in a cost favorable manner. The performed adjustment can be fixed in a simple additional means, so that in rough operation a deadjustment of the electromagnetic adjusting device does not occur.

In accordance with another feature of the present invention a shaped member is welded with a coating which covers a housing button and is composed for example of a non-magnetic material, such as plastic. With this feature a price-favorable construction that is particularly simple for manufacturing can be provided for adjusting of the electromagnet.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 2 and 3 are schematic views showing a longitudinal section of the electromagnet of FIG. 1 in accordance with two further embodiments.

DESCRIPTION OF THE PREFERRED EMBODIMENTS

Figure 1:
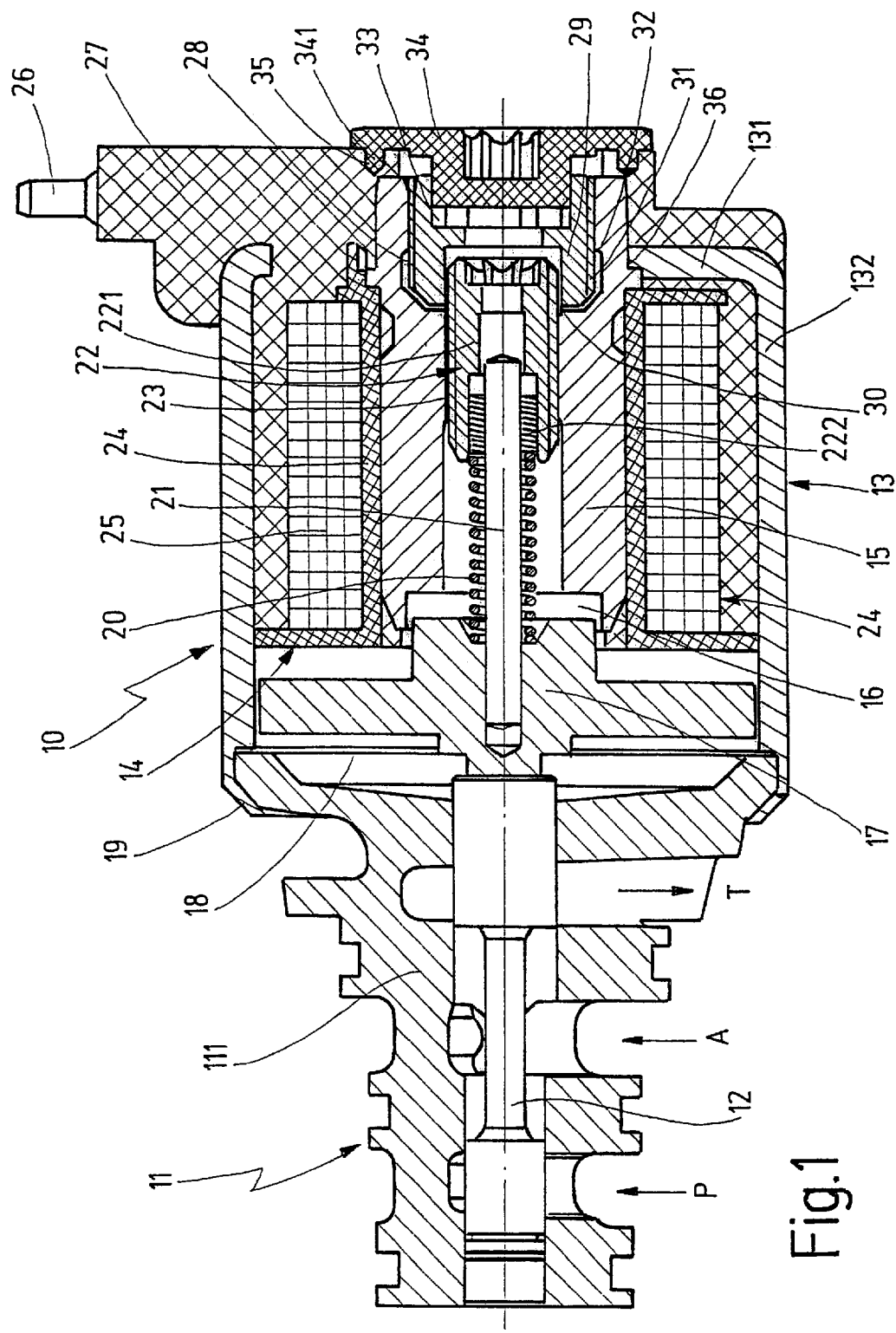
FIG. 1 is a view showing a longitudinal section of an electromagnetic adjusting device for an automatic transmission of a motor vehicle, partially schematic.

An adjusting device for an automatic transmission of a motor vehicle shown in a longitudinal section in FIG. 1 has an electromagnet 10 and a proportional valve which is formed as a 3/2 directional valve 11 and fixed at the end side of the electromagnet 10. The valve connections are identified with P, A and T. They are controlled by a control slider 12 formed as a double-piston slider and actuated by the electromagnet 10.

The electromagnet 10 has a cup-shaped housing 13 of a ferromagnetic material that surrounds a magnetic coil 14, a central part 15 that extends coaxially from a housing bottom 131 to support the magnetic coil 14 and is composed of ferromagnetic material, also known as a magnetic coil, and a movable armature 17 which is located before the central part 15 leaving a working air gap 16 and is composed of a ferromagnetic material. The central part 15 is inserted in a coaxial opening 36 in the housing bottom 131 and extends outwardly beyond the outwardly located bottom surface of the housing bottom 131.

The central part 15, the housing 13 and the armature 17 form a closed magnetic circuit, including the working air gap 16, for the magnetic flux produced by the magnetic coil 14. The armature 17 and the control slider 12 of the 3/2 directional valve 11 abut against one another in the region of the adjusting device in adherent manner. A diaphragm spring 18 is fixedly connected with the armature 17 and tightened at the edge side of the valve body 111 at the housing 13. The valve body 111 is fixed by a flanging 19 on the end side of the housing 13.

The armature 17 is loaded by a restoring spring 20 which counteracts the magnetic force of the electromagnet 10 and by the diaphragm spring 18 which acts opposite to the restoring spring 20 with a smaller spring force. The restoring spring 20 is arranged in the interior of the hollow-cylindrical central part 15 and displaced on a supporting rod 21 which is mounted in the armature 17 and extends coaxially in the interior of the central part 15. The restoring spring 20 formed as a pressure spring is supported at one side against the armature 17 and at the other side against a tensioning member 22 which is screwed in an inner thread 23 provided in the inner wall of the central part 15. As the tensioning member 22, an adjustment screw 221 can be utilized. Receiving in a sliding bearing 222 the supporting rod 21 is composed of non-magnetic material and formed as a cylinder pin. By more or less deep screwing-in of the tensioning member 22, the restoring spring 20 can be tensioned more or less.

The magnetic coil 14 is composed of a coil body 24 and an excitation winding 25 received by the coil body 24. It is wound in many layers of an insulating winding wire, for example a copper lacquered wire. For current supply of the excitation winding 25, the electrical terminals 26 are provided. They are fixed in a cover 27 of insulating material, for example synthetic plastic, which covers the housing bottom 131. The cover 27 can be an individual component. At the same time it can be realized as synthetic plastic molding which surrounds the housing body 131 and the magnetic coil 14.

Because of the manufacturing dispersion and the tolerances of the components of the electromagnets 10 and the permeability fluctuations in the magnetic material the magnetic force of the electromagnet 10 is subjected to different dispersion inside a manufacturing series. They negatively affect the regulating pressure-current characteristic line of the adjusting device. For compensating of these dispersions of the magnetic force, means are provided in a magnetic circuit for the magnetic flux for changing the magnetic resistance of the magnetic circuit. These means include a hollow cylindrical depression 28 which is produced in the central part 15 from its end side through a blind hole with an opening diameter which is greater than the light diameter of the central part 15. This means also includes a hollow cylindrical, ferromagnetic filling member 29 which is inserted in the depression 28 and has an end side with which the bottom of the depression 28 limits an auxiliary air gap 30. Because of the chamfering of the end of the filling member 29 and the inclination in the transition region from the bottom to the inner wall of the depression 28, the additional air gap 30 has two ring-shaped partial portions, including a portion which is perpendicular to the housing axis and the portion which is arranged at an acute angle to the housing axis.

The hollow cylindrical or sleeve-shaped filling member 29 is axially displaceable for adjusting of the axial gap width of the additional air gap 30 in the depression 28. It has for this purpose an outer thread 31 which is screwable into an inner thread 32 provided in the inner wall of the depression 28. Alternatively, instead of the screw thread, a displacement seat between the depression 28 and the filling member 29 can be provided. For adjustment purposes, the filling member 29 has an inner hexagon 33 in which an auxiliary tool can be inserted. Instead of an inner hexagon, the filling member 29 can be formed as a torx or a slot. The axial depth of the depression 28 is determined so that the bottom of the depression 28 has an axial distance from the inner bottom surface of the housing bottom 131. The depression 28 thereby limits a magnetic narrow point in the magnetic circuit, which is connected parallel to the magnetic resistance formed by the auxiliary air gap 30.

At the end side of the hollow cylindrical filling member 29 that faces away from the auxiliary air gap 30, a shaped member 34 which has a T-shaped cross-section and is composed of a non-magnetic material, in the embodiment of FIG. 1 of synthetic plastic, is inserted with its shaft part in a form-locking manner into the inner hexagon 33. This shaped member 34 is pressed with a ring-shaped clamping edge 341 which extends at the lower side of its transverse part, into a coaxial ring groove 35 provided on the outer side of the cover 27, and thereby it is held non-displaceably on the cover 27 and covers the filling member 29 from outside. Simultaneously the shaft part of the shaped member 34 inserted in the inner hexagon 33, secures the adjusted position of the filling member 29. Instead of the firm clamping of the shaped member 34, it can be also welded with the cover 27, for example by ultrasound.

After the assembly of the electromagnet 10 and its connection with the 3/2 directional valve 11, the electromagnet 10 is adjusted with respect to its magnetic force so that the desired slope of the regulating pressure-current characteristic line of the electromagnetic adjusting device is located within a predetermined tolerance region. For this purpose in an iterative process the restoring force of the restoring spring 20 is adjusted by turning of the tensioning member 22 and the desired magnetic force by displacement of the filling member 29 in the depression 28, until the desired slope of the characteristic line is obtained. After this the shaped member 34 is inserted in the inner hexagon 33 in the filling member 29, and pressed with its clamping edge 341 in the ring groove 35 or welded with the cover 27. Thereby on the one hand the performed adjustment of the filling member 29 is secured, and on the other hand the hollow interior of the filling member 29, tensioning member 22 and the central part 15 is closed.

FIG. 2 schematically shows a longitudinal section of a further embodiment of an electromagnet 10', which can be used instead of the electromagnet 10 in the adjusting device of FIG. 1. The electromagnet 10 of FIG. 2 differs from the electromagnet of FIG. 1 substantially in that, the auxiliary air gap 30 is located much deeper in the central part 15 and is limited by two parallel surfaces of the central part 15 and the filling member 29 which are spaced from one another by a gap distance. Dispensed with are the shaped member to close the filling member 29 and the coil body of the magnetic coil which is injection molded with synthetic plastic. The housing bottom 131 is again covered with a coating 27 composed of synthetic plastic injection molded material, in which a corresponding opening for actuation of tensioning member 22 and filling member 29 is provided, which is close with the shape member. The shaped member here takes over the safety functions for the performed adjustment of the tensioning member 22 and the filling member 29. The construction as well as the operation of the electromagnet 10' is the same as in FIG. 1, so that the same components are identified with the same reference numerals.

In the embodiment of FIG. 3, the electromagnet 10" is modified so that the auxiliary air gap 30 in the magnetic circuit is dispensed with and replaced with the magnetic narrowing. Means for changing the magnetic resistance of the magnetic circuit have for this purpose a portion 40 arranged in a housing wall 132 of the housing 10 and having a limited length with the reduced cross-section, as well as an adjusting ring 41 composed of a ferromagnetic material and axially displaceable on the housing wall 132 for changing the reduced cross-section of the magnetic material. The portion 40 in the housing wall 133 for this purpose is formed so that a ring groove 42 is provided in the inner wall of the housing wall 132 and filled with a synthetic plastic injection material which surrounds the synthetic plastic material of the excitation winding 25 of the magnetic coil 14. The so-called magnetic narrow point in the magnetic circuit formed by the portion 40 increases the magnetic resistance of the magnetic circuit.

When the adjusting ring 41 which slides without gap in the housing wall 132 is displaced onto the portion 40, the magnetic resistance of the magnetic circuit is substantially reduced, so that thereby the regulating pressure-current characteristic line of the control device can be corrected within certain limits. Since there is no additional air gap, the filling member is also dispensed with. The hollow cylindrical central part 15 is formed as a throughgoing part and as in the embodiment of FIGS. 1 and 2 is inserted in the central opening 36 in the housing bottom 131. The end side of the central part 15 is closed substantially with the outer surface of the housing bottom 131.

It will be understood that each of the elements described above, or two or more together, may also find a useful application in other types of constructions differing from the types described above.

While the invention has been illustrated and described as embodied in electromagnetic adjusting device, it is not intended to be limited to the details shown, since various modifications and structural changes may be made without departing in anyway from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An electromagnetic adjusting device for automatic transmissions of motor vehicles, comprising an electromagnet having a magnetic coil; a substantially cup-shaped housing which surrounds said magnetic coil and is composed of a ferromagnetic material, said housing having a housing bottom, a ferromagnetic central part which extends from said housing bottom and supports said magnetic coil, and a movable armature located before said central part and leaving a working air gap so as to form with said housing and said central part a magnetic circuit which has a magnetic resistance for a magnetic flux; and means for changing the magnetic resistance, said means for changing the magnetic resistance including an axial depression provided in said central part and an axially displaceable ferromagnetic filling member inserted in said depression and limiting with a bottom of said depression an auxiliary air gap.

2. An electromagnetic adjusting device as defined in claim 1, wherein said housing bottom has a central opening in which said central part is inserted.

3. An electromagnetic adjusting device as defined in claim 1, wherein said depression has a depth selected so that said bottom of said depression is offset back relative to said housing bottom.

4. An electromagnetic adjusting device as defined in claim 1, wherein said central part and said filling member are hollow cylindrical, and said auxiliary air gap which is limited by said bottom of said depression and said filling member being substantially formed as a ring-shaped gap.

5. An electromagnetic adjusting device as defined in claim 1, wherein said filling member has an outer thread, said depression having an inner thread in which said filling member is screwable with said outer thread.

6. An electromagnetic adjusting device as defined in claim 1; and further comprising a displacement seat arranged between said filling member and said depression.

7. An electromagnetic adjusting device as defined in claim 1; and further comprising a shaped member fixed on said housing body and composed of a non-ferromagnetic material, said shaped member extending from an end side of said filling member which faces away from said auxiliary air gap and engaging in said filling member.

8. An electromagnetic adjusting device as defined in claim 7; and further comprising a coating which covers said housing bottom and is composed of a non-magnetic synthetic material, said shaped member being pressed with a ring-shaped clamping edge in a ring groove of said coating.

9. An electromagnetic adjusting device as defined in claim 7; and further comprising a coating which covers said housing bottom and is composed of a non-magnetic synthetic material, said shaped member being welded with said coating.

10. An electromagnetic adjusting device as defined in claim 1, wherein said shaped member engages in said filling member in a form-locking manner.

11. An electromagnetic adjusting device as defined in claim 1; and further comprising a restoring spring which counteracts a magnetic force of said electromagnet, said being loaded with said restoring spring.

12. An electromagnetic adjusting device as defined in claim 11, wherein said restoring spring is received in an interior of said hollow-cylindrical central part and is supported at one side against said armature and at the other side against an axially adjustable tensioning member in said central part.

13. An electromagnetic adjusting device as defined in claim 1, wherein said means for changing the magnetic resistance of the magnetic circuit have a portion arranged in a housing wall of said housing and having a limiting length with a reduced wall section, and an axially displaceable adjusting ring composed of a ferromagnetic material.

* * * * *